United States Patent
Saito

(10) Patent No.: US 11,538,334 B2
(45) Date of Patent: Dec. 27, 2022

(54) HEAD-UP DISPLAY DEVICE

(71) Applicant: NIPPON SEIKI CO., LTD., Niigata (JP)

(72) Inventor: Maiko Saito, Niigata (JP)

(73) Assignee: NIPPON SEIKI CO., LTD., Niigata (JP)

(*) Notice: Subject to any disclaimer, the term of this patent is extended or adjusted under 35 U.S.C. 154(b) by 244 days.

(21) Appl. No.: 16/762,060

(22) PCT Filed: Nov. 26, 2018

(86) PCT No.: PCT/JP2018/043319
§ 371 (c)(1),
(2) Date: May 6, 2020

(87) PCT Pub. No.: WO2019/107295
PCT Pub. Date: Jun. 6, 2019

(65) Prior Publication Data
US 2020/0269692 A1    Aug. 27, 2020

(30) Foreign Application Priority Data
Nov. 30, 2017  (JP) .............................. JP2017-231176

(51) Int. Cl.
*G08G 1/09* (2006.01)
*B60K 35/00* (2006.01)
(Continued)

(52) U.S. Cl.
CPC ............... *G08G 1/09* (2013.01); *B60K 35/00* (2013.01); *B60W 40/04* (2013.01); *B60W 50/14* (2013.01);
(Continued)

(58) Field of Classification Search
CPC ............. G06K 9/00825; G06K 9/4652; G06K 9/4671; B60K 35/00; B60K 2370/1529;
(Continued)

(56) References Cited

U.S. PATENT DOCUMENTS

2015/0046055 A1* 2/2015 Yamada ........... G08G 1/096758
340/905
2018/0201134 A1* 7/2018 Choi ........................ G06T 17/05
2020/0265715 A1* 8/2020 Maeda ............. G08G 1/096783

FOREIGN PATENT DOCUMENTS

EP           1975675 A1   10/2008
JP        2008-149786 A    7/2008
(Continued)

OTHER PUBLICATIONS

International Search Report issued in corresponding International Patent Application No. PCT/JP2018/043319, dated Jan. 8, 2019, with English translation.
(Continued)

*Primary Examiner* — Douglas M Wilson
(74) *Attorney, Agent, or Firm* — McDermott Will & Emery LLP

(57) ABSTRACT

The present invention enables recognition of traffic light lamp color in place of or in addition to simply displaying the traffic light lamp color in a color image. A projection unit projects, towards a part subject to projection, display light L that can display an image at a variable display distance. A lamp color information acquisition unit acquires a lamp color of a traffic light which a vehicle will be driving through. A display distance adjustment unit changes the display distance of the image based on the lamp color acquired by an information acquisition unit.

5 Claims, 5 Drawing Sheets

(51) Int. Cl.
  *B60W 50/14* (2020.01)
  *G02B 27/01* (2006.01)
  *G09G 5/38* (2006.01)
  *G09G 5/00* (2006.01)
  *G06V 20/58* (2022.01)
  *G06V 10/56* (2022.01)
  *B60W 40/04* (2006.01)

(52) U.S. Cl.
  CPC ............ *B60K 2370/1529* (2019.05); *B60K 2370/166* (2019.05); *B60K 2370/179* (2019.05); *B60K 2370/186* (2019.05); *B60K 2370/334* (2019.05); *B60K 2370/5915* (2019.05); *B60W 2050/146* (2013.01); *G02B 27/0101* (2013.01); *G02B 2027/0185* (2013.01); *G06V 10/56* (2022.01); *G06V 20/584* (2022.01); *G09G 5/00* (2013.01); *G09G 5/38* (2013.01)

(58) Field of Classification Search
  CPC ........ B60K 2370/334; B60K 2370/166; B60K 2370/21; B60K 2370/5915; B60K 2370/179; B60K 2370/186; B60W 40/04; B60W 50/14; B60W 2050/146; G02B 2027/0185; G02B 27/0101; G08G 1/09; G09G 5/00; G09G 5/38; G06V 10/56; G06V 20/584
  See application file for complete search history.

(56) References Cited

FOREIGN PATENT DOCUMENTS

| | | |
|---|---|---|
| JP | 2016-112984 A | 6/2016 |
| WO | 2014/192594 A1 | 12/2014 |

OTHER PUBLICATIONS

Extended European Search Report issued in corresponding EP Application No. 18882674.7, dated Jul. 22, 2021.

\* cited by examiner

[Fig.1]
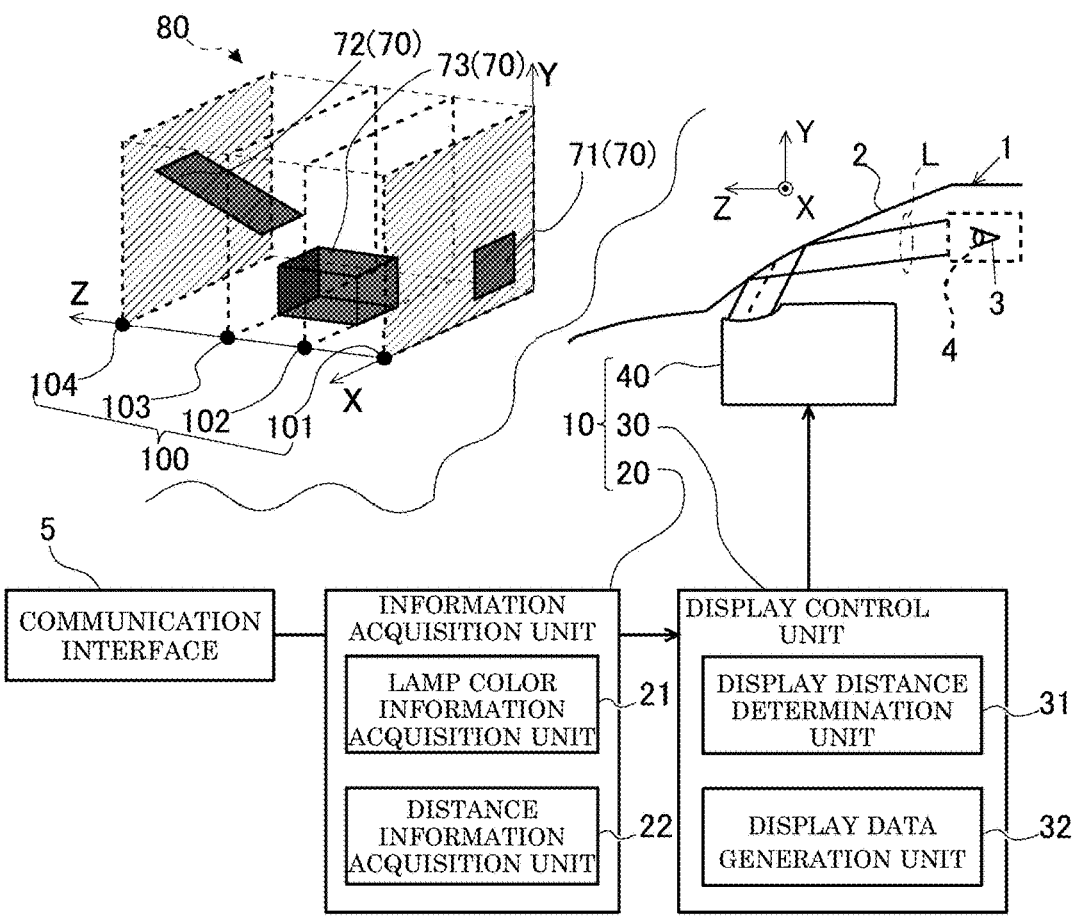
[Fig.2]
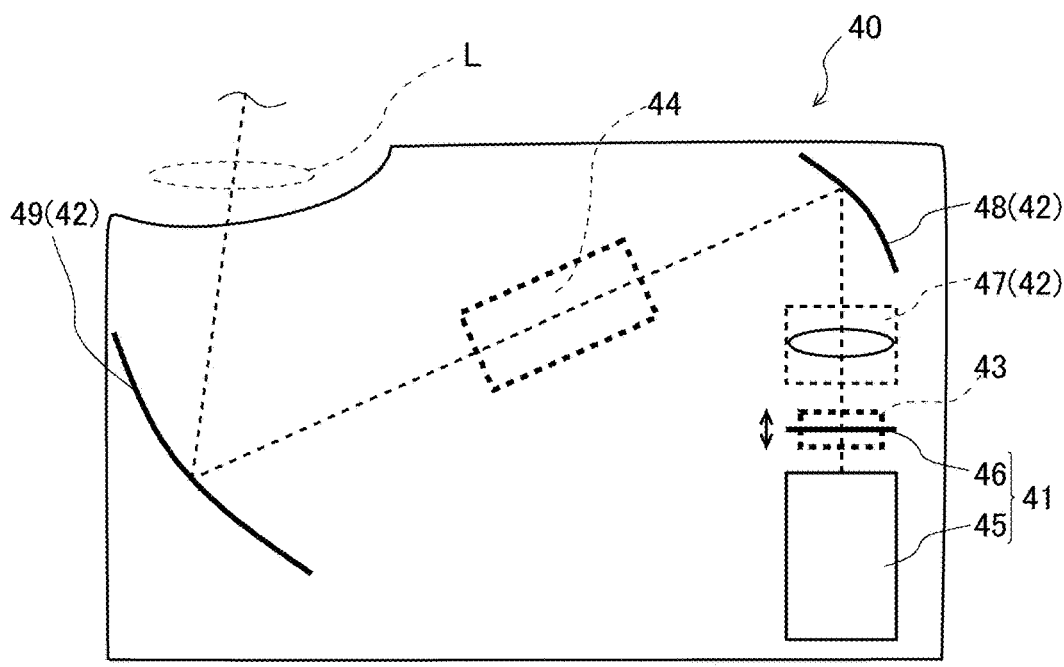

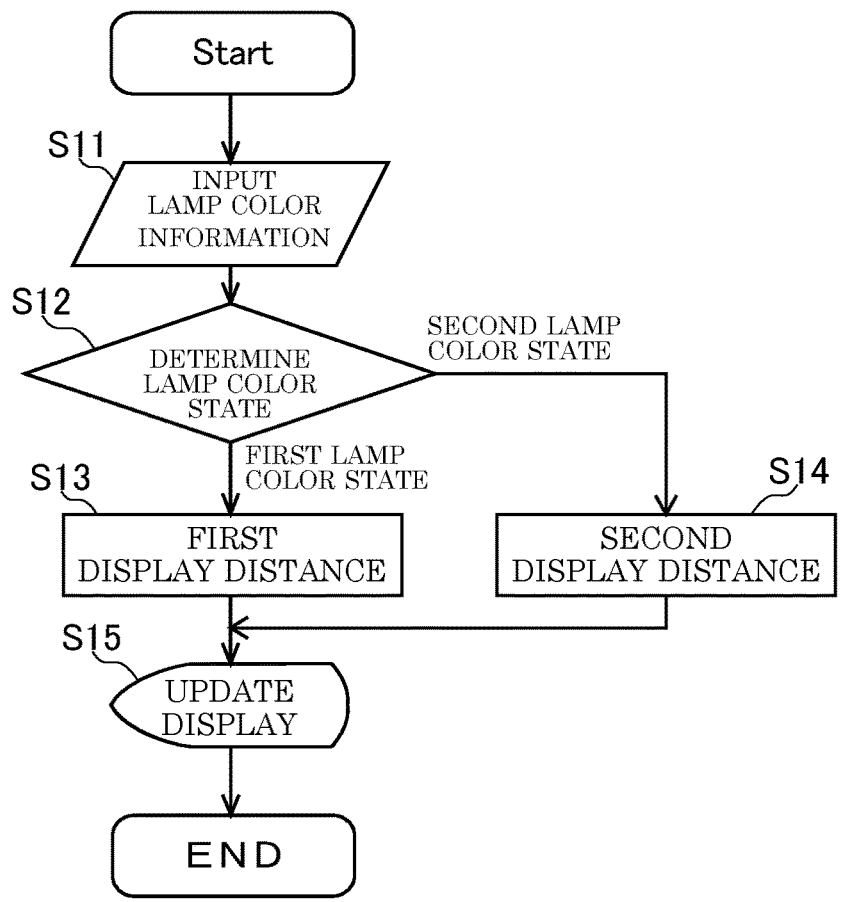
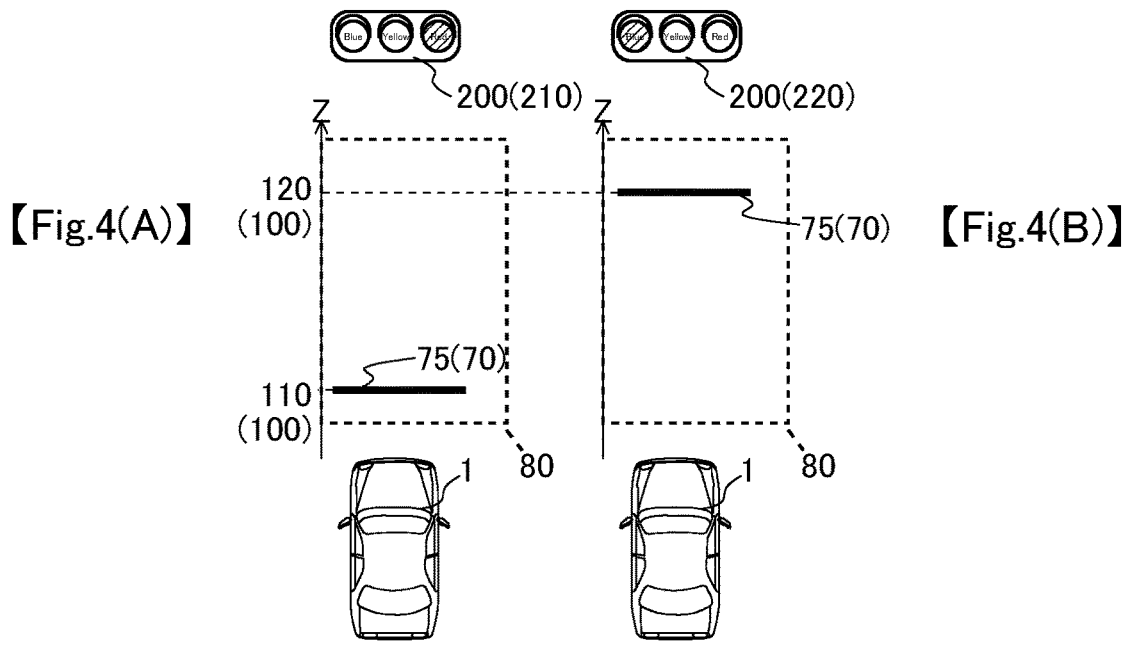

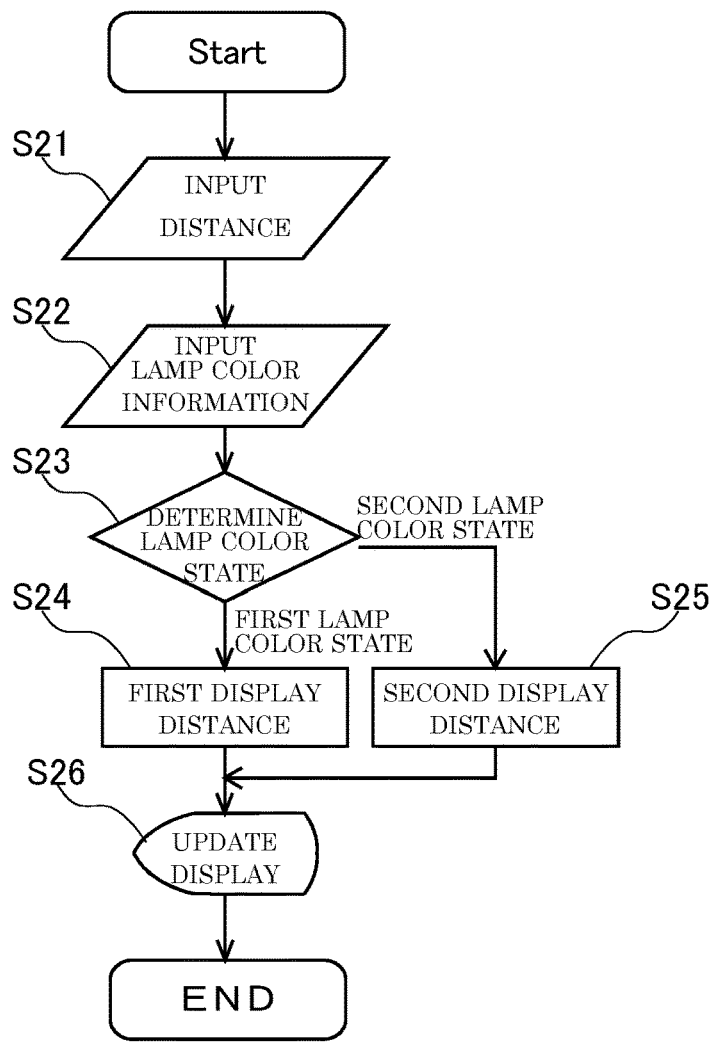
[Fig.5]
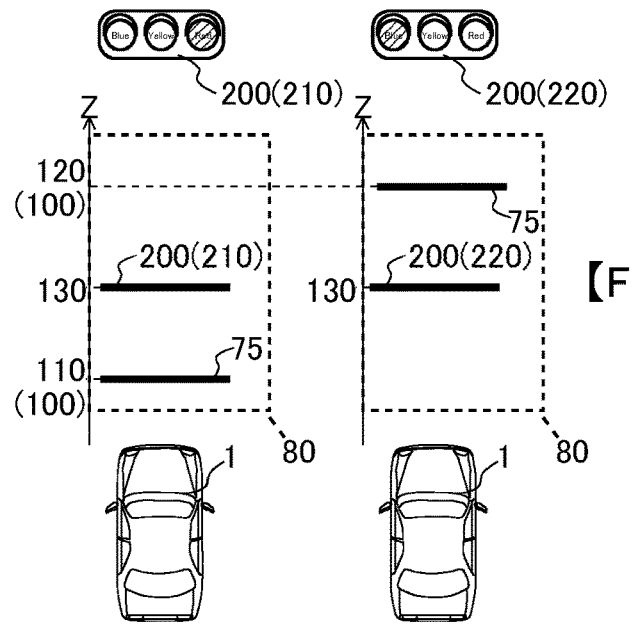
[Fig.6(A)]   [Fig.6(B)]

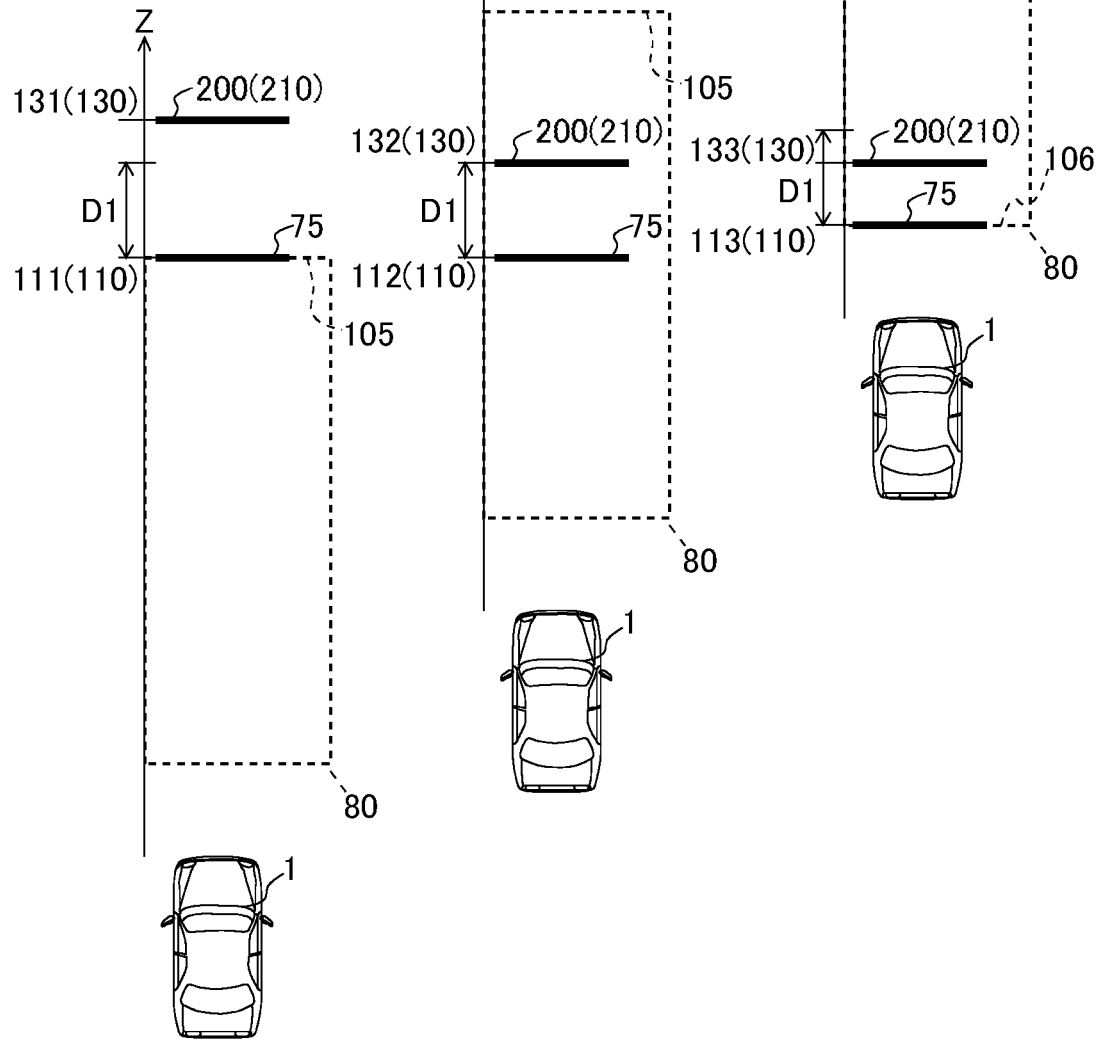

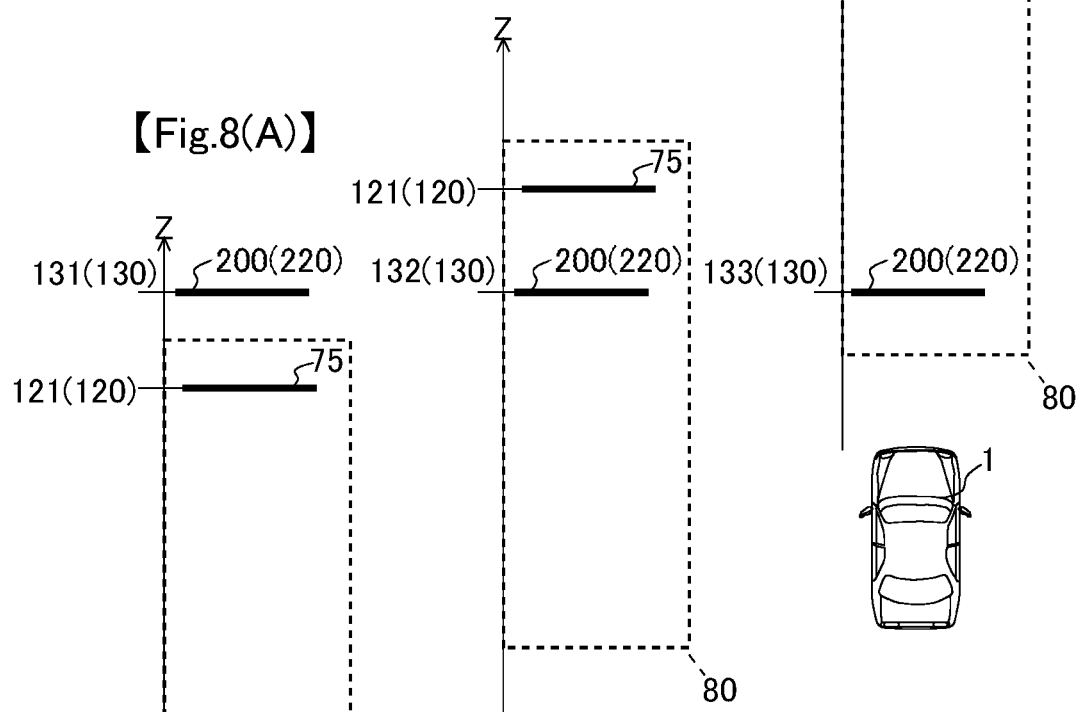
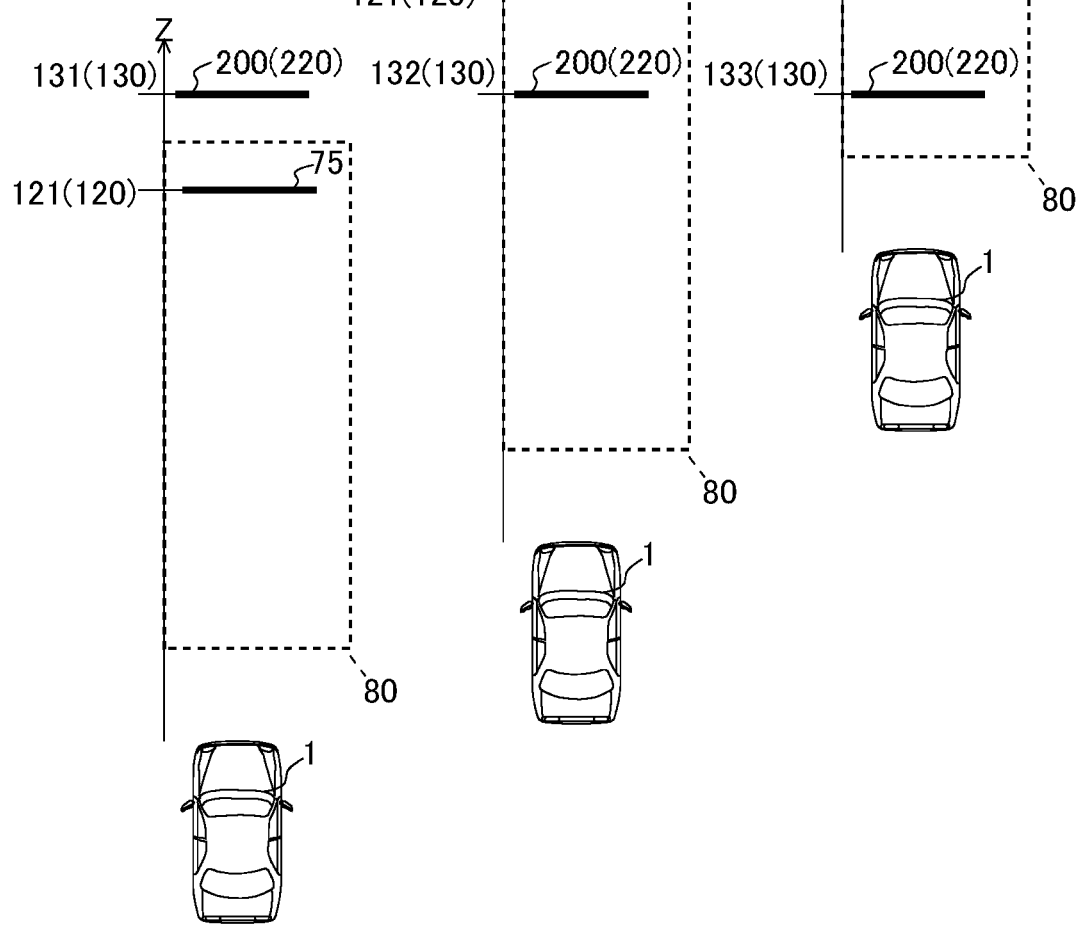

HEAD-UP DISPLAY DEVICE

CROSS REFERENCE

This application is the U.S. National Phase under 35 U.S.C. § 371 of International Application No. PCT/JP2018/043319, filed on Nov. 26, 2018, which claims the benefit of Japanese Application No. 2017-231176, filed on Nov. 30, 2017, the entire contents of each are hereby incorporated by reference.

TECHNICAL FIELD

The present invention relates to a head-up display (HUD) device to be mounted on a vehicle.

BACKGROUND ART

HUD devices enable a viewer (typically, a driver of a vehicle) to visually recognize an image superimposed on a foreground of the vehicle. As described above, the HUD devices display an image which is to present, to the viewer, information superimposed on the foreground, so that the viewer can recognize the information indicated by the image without largely shifting a line of sight from the foreground, and therefore, the HUD devices can reduce a burden due to a movement of the line of sight by the viewer and contribute to safe driving.

In particular, an HUD device disclosed in Patent Document 1 receives a lamp color state of a traffic light which a vehicle is scheduled to pass, and displays an image indicating the lamp color state of the traffic light, and thus, a user can easily recognize the lamp color state of the traffic light.

PRIOR ART DOCUMENT

Patent Document

Patent Document 1: Japanese Unexamined Patent Application Publication No. 2016-112984

SUMMARY OF THE INVENTION

Problems to be Solved by the Invention

However, if the lamp color state is simply displayed as an image, an action performed by the user is eventually the same between an action of recognizing the lamp color state of a traffic light in a real scene and an action of recognizing the lamp color state in the image, and thus, the same burden is imposed on the driver for determining the lamp color state of the traffic light.

One object of the present invention is to provide a head-up display device allowing for recognition of a lamp color state of a traffic light instead of or in addition to simply displaying a color image of the lamp color state of the traffic light.

Solution to Problem

To solve the above-described problems, the present invention employs the following means.

A head-up display device according to the present invention is capable of adjusting a display distance which is a distance to an image recognized by a viewer, and its gist is to cause a lamp color state of a traffic light recognized from difference in the display distance by changing the display distance based on the lamp color state.

A head-up display device according to a first aspect of the present invention includes: a projection unit (40) configured to project, towards a projected portion, display light (L) displaying an image (70) at a variable display distance (100) from a viewer; a lamp color information acquisition unit (21) configured to acquire a lamp color state (210, 220) of a traffic light which a vehicle is scheduled to pass; and a display distance adjustment unit (31) configured to change the display distance (100) of the image (70), based on the lamp color state acquired by the information acquisition unit (20).

According to the first aspect, a display position (display distance) in a depth direction of the image to be visually recognized by the viewer can be adjusted to be near the viewer or far away from the viewer in accordance with the lamp color state of the traffic light. Thus, if the image includes an image indicating the lamp color state of the traffic light, it is possible for the viewer to recognize the lamp color state of the traffic light more reliably or more emphatically, based on different processes for change in color of the image indicating the lamp color state or for change in display distance of the image. Further, if the image does not include an image indicating the lamp color state of the traffic light, it is possible for the viewer to recognize the lamp color state of the traffic light more reliably or more emphatically, based on different processes for change in lamp color of the traffic light being a real object existing in the real scene or for change in display distance of the image.

The head-up display device according to a second aspect dependent on the first aspect further includes a distance information acquisition unit (22) configured to acquire a distance (130) to the traffic light of which the lamp color state is acquired by the lamp color information acquisition unit (21), and the display distance adjustment unit (31) refers to the distance (130) to the traffic light acquired by the distance information acquisition unit (22), and if the lamp color state acquired by the lamp color information acquisition unit (21) is a first lamp color state (210), the display distance adjustment unit (31) displays at least a part of the image (70) to be visually recognized in front of the traffic light, and if the lamp color state acquired by the lamp color information acquisition unit (21) is a second lamp color state (220), the display distance adjustment unit (31) displays at least a part of the image (70) to be visually recognized behind the traffic light.

According to the second aspect, it is possible to switch the display position of the image between in front of and behind the traffic light in accordance with the lamp color state of the traffic light. Therefore, it is possible to guess the lamp color state of the traffic light depending on whether the image is displayed in front of or behind the traffic light, and thus, it is easier to clearly determine the lamp color state than in a case where the large display distance and the short display distance of the image are simply switched. It is noted that the distance between a near side and a far side of the display position of the image is preferably 5 [m] or more.

Further, in the head-up display device according to a third aspect dependent on the second aspect, the first lamp color state (210) is red, and the second lamp color state (220) is green.

In the third aspect, if the traffic light is red, an image is displayed in front of the traffic light, and thus, if the eye is focused on the image, the red traffic light is located farther away from a position on which the eye is focused. In general, the visibility on the far side from a position on which the eye is focused (focused position) is high, so that even if an image is visually recognized, attention can be easily directed to the red traffic light. Further, if the traffic light is green, the image is displayed behind the traffic light, and thus, if the eye is focused on the image, the green traffic light is located closer than a position on which the eye is focused. The visibility on the near side from the focused position is low, so that if an image is visually recognized, it is less likely that attention is directed to a green traffic light that requires little attention, and visual attention is less likely to be distracted.

Further, in the head-up display device according to a fourth aspect dependent on the second or third aspect, if the display distance adjustment unit (31) displays at least a part of the image (70) to be visually recognized in front of the traffic light, the display distance adjustment unit (31) gradually reduces the display distance (100) as the distance to the traffic light acquired by the distance information acquisition unit (22) decreases.

In the fourth aspect, as the distance to the traffic light decreases, the display distance is gradually reduced. In other words, the display distance of the image follows the position of the traffic light. Therefore, even if the traffic light gradually approaches, the distance between the traffic light and the image is constant or hardly changes, so that a focusing movement between the traffic light and the image can be facilitated. Further, when the image is arranged in front of the traffic light, as described in the third aspect, even if the image is visually recognized, it is likely that attention is directed to the traffic light behind the image, and it is possible to smoothly move the focus from the image to the traffic light behind the image.

Further, in the head-up display device according to a fifth aspect dependent on the second to fourth aspects, if the display distance adjustment unit (31) displays at least a part of the image to be visually recognized behind the traffic light, the display distance adjustment unit (31) maintains the display distance (100) constant even if the distance to the traffic light acquired by the distance information acquisition unit (22) decreases.

In the fifth aspect, the display distance is maintained constant regardless of the distance to the traffic light. In other words, the display distance of the image does not follow the position of the traffic light.

Therefore, even if the traffic light gradually approaches, the distance between the vehicle and the image is constant, so that a focusing movement to the image can be facilitated, regardless of the position of the traffic light. Further, when the image is arranged behind the traffic light, as described in the third aspect, if the image is visually recognized, it is less likely that attention is directed to the traffic light in front of the image, however, since an interval between the position of the traffic light and the display distance of the image increases in accordance with the position of the traffic light, it is difficult to smoothly move the focus between the image and the traffic light in front of the image, so that it is even less likely that visual attention is directed to the traffic light.

BRIEF DESCRIPTION OF THE DRAWINGS

FIG. 1 is a diagram for explaining a configuration of an HUD device according to first to fourth embodiments of the present invention and an image displayed by the HUD device.

FIG. 2 is a diagram illustrating a configuration of a projection unit in the HUD device according to the embodiments.

FIG. 3 is a flowchart illustrating a main operation procedure of the HUD device in the first embodiment of the present invention.

FIG. 4(a) and FIG. 4(b) are diagrams each illustrating a display example of an image displayed by the HUD device according to the first embodiment.

FIG. 5 is a flowchart illustrating a main operation procedure of the HUD device in the second embodiment of the present invention.

FIG. 6(a) and FIG. 6(b) are diagrams each illustrating a display example of an image displayed by an HUD device according to the second embodiment.

FIG. 7(a) to FIG. 7(c) are diagrams each illustrating a display example of an image displayed by an HUD device according to the third embodiment of the present invention.

FIG. 8(a) to FIG. 8(c) are diagrams each illustrating a display example of an image displayed by an HUD device according to the fourth embodiment of the present invention.

MODE FOR CARRYING OUT THE INVENTION

Embodiments described below are employed to facilitate understanding of the present invention and those skilled in the art should note that the present invention is not unduly limited by the embodiments described below.

FIG. 1 is a diagram for explaining a configuration corresponding to each of first to fourth embodiments of a head-up display (hereinafter, also referred to as HUD) device 10 according to the present invention and an image 70 displayed by the HUD device 10. It is noted that in FIG. 1, a front-rear direction of a vehicle 1 is regarded as a Z direction (the front direction thereof is a positive Z direction), a direction along a left-right direction of the vehicle 1 (a width direction of the vehicle 1) is regarded as an X direction (the left direction thereof is a positive X direction), and an up-down direction is regarded as a Y direction (the upward direction thereof is a positive Y direction).

In FIG. 1, the HUD device 10 according to the present embodiment is communicably connected to a communication interface 5. The communication interface 5 may include a wired communication function such as a USB port, a serial port, a parallel port, an OBD II, and/or any other suitable wired communication port. A data cable from the vehicle 1 is connected to an information acquisition unit 20 of the HUD device 10 via the communication interface 5 to transmit information to the HUD device 10. It is noted that in another embodiment, the communication interface 5 may include a wireless communication interface using, for example, a Bluetooth (registered trademark) communication protocol, an IEEE 802.11 protocol, an IEEE 1002.11 protocol, an IEEE 1002.16 protocol, a Dedicated Short Range Communications (DSRC) protocol, a shared wireless access protocol, a wireless USB protocol, and/or any other suitable wireless technology.

Configuration of HUD Device 10

The HUD device 10 includes the information acquisition unit 20 being an input interface configured to acquire various types of information from the communication interface 5, a display control unit 30, and a projection unit 40 configured to project display light L. For example, the communication interface 5 is connected with a vehicle ECU, a vehicle-mounted camera, and a sensor provided in the vehicle 1, another vehicle-mounted device in the vehicle, a portable device in the vehicle, another vehicle (vehicle-to-vehicle communication V2V), communication infrastructure on a road (road-to-vehicle communication V2I), a pedestrian portable device (communication V2X between a vehicle and a pedestrian), and the like, so that information can be received, and the HUD device 10 receives various types of information from the information acquisition unit 20 connected to the communication interface 5 and reflects the information on the image 70 to be displayed.

The HUD device 10 according to the present embodiment projects the display light L toward a projected portion 2 provided inside the vehicle 1 and configured to transmit a part of the light and reflect a part of the light. The projected portion 2 may be configured as a part of a front windshield of the vehicle 1 or may be a dedicated part such as a combiner. An eye box 4 is formed by the display light L reflected by the projected portion 2 in an area where an eye 3 of a viewer (driver of the vehicle 1) is assumed to be placed. The driver can visually recognize the entire image 70 displayed by the HUD device 10 if the eye 3 is placed in the eye box 4, and the driver cannot visually recognize (cannot easily visually recognize) a part of the image 70 if the eye 3 is out of the eye box 4. The HUD device 10 according to the present embodiment can adjust, in the X direction, in the Y direction, and in the Z direction, positions at which images 71, 72, and 73 are displayed. That is, the HUD device 10 can adjust a display distance 100 being a distance in the depth direction Z, particularly from the eye box 4 to where the images 71, 72 and 73 are formed, and can arrange (display) the images 71, 72, and 73 within an image display area 80 being a three-dimensional space.

The display control unit 30 includes a display distance determination unit 31 and a display data generation unit 32. The display control unit 30 generates display data, based on the information acquired from the information acquisition unit 20, and displays the image 70 by driving the projection unit 40, based on the display data.

The display distance determination unit 31 determines the display distances 100 of the image 70, and can determine the display distances 100 of the image 70 (specifically, of each of the images 71, 72, and 73 within the image display area 80) in accordance with the information acquired by the information acquisition unit 20. Details will be described later.

The display data generation unit 32 generates display data, and the projection unit 40 is driven based on the display data. The display data includes display distance data for driving the projection unit 40 to display the image 70 at the display distance 100 determined by the display distance determination unit 31.

[Description of Image]

An example of the image 70 displayed by the HUD device 10 according to the present embodiment will be described with respect to a left-side part of FIG. 1. The image 70 includes, for example, the first 2D image 71 and the second 2D image 72 which are represented in a planar manner, and the 3D image 73 represented in a three-dimensional manner. The first 2D image 71 is formed on an XY plane at a display distance 101 in FIG. 1 in a planar manner, and does not enable the driver to feel a sense of perspective. The whole display of the first 2D image 71 thus formed can be clearly recognized, substantially without adjusting the focus of the eyes. The second 2D image 72 has one end on the XY plane at a display distance 103 of FIG. 1 and the other end on the XY plane at a display distance 104 farther apart from the driver relative to the display distance 103, and is formed in a planer manner and enables the driver to feel a sense of perspective. The second 2D image 72 thus formed can give a three-dimensional impression because the whole display is clearly recognized if the focus of the eyes of the driver is adjusted. In an example of the 3D image 73, the 3D image 73 has one end on the XY plane at a display distance 102 in FIG. 1 and the other end on the XY plane at the display distance 103 farther apart from the driver relative to the display distance 102, and is formed as a three-dimensional object having a volume and enables the driver to feel a three-dimensional effect. If lengthening the display distance 100 is expressed in other words, it indicates forming the image 70 at a position farther apart from the eye box 4, and for example, this means that the first 2D image 71 displayed at the display distance 101 and the 3D image 73 displayed between the display distance 102 and the display distance 103 are brought close to the display distance 104 farther away from the eye box 4. On the other hand, if shortening the display distance 100 is expressed in other words, it indicates forming the image 70 at a position closer to the eye box 4, and for example, this means that the first 2D image 71 displayed at the display distance 104 and the 3D image 73 displayed between the display distance 102 and the display distance 103 are brought close to the display distance 101 nearer the eye box 4.

Example of Configuration of Projection Unit 40

Next, the description proceeds with reference to FIG. 2. FIG. 2 is a diagram illustrating an example of a configuration of the projection unit 40 in FIG. 1. The projection unit 40 according to the present embodiment includes a stereoscopic image display unit 41 and relay optical units 42, and the stereoscopic image display unit 41 forms a first 3D real image 43, the relay optical units 42 magnify the first 3D real image 43 to form a second 3D real image 44 and project the display light L of the second 3D real image 44 toward the projected portion 2 outside.

The stereoscopic image display unit 41 in FIG. 2 generates the first 3D real image 43 formed in three dimensions, and includes an image projection unit 45 and a vibrating screen 46.

The image projection unit 45 is a projector configured to emit video light (not illustrated) representing a video included in display data, based on the display data input from the display control unit 30, adjusts a timing for displaying the video in accordance with display distance data included in the display data, and switches the video at high speed to project the video in synchronization with a vibration position of the vibrating screen 46. In other words, based on the display distance data, the image projection unit 45 projects the video suitable for the vibration position of the vibrating screen 46, onto the vibrating screen 46.

The vibrating screen 46 is, for example, a diffusion film made of polycarbonate for diffusing video from the image projection unit 45 into a certain angle range, receives the video light from the image projection unit 45 to form a real image, and reciprocates along an optical axis of the video light emitted from the image projection unit 45. The vibrating screen 46 can continuously or intermittently transmit a signal indicating a vibration position to the image projection unit 45, and the image projection unit 45 may adjust the timing for displaying the video, based on the signal indicating the vibration position, so that the image 70 is visually recognized at a position in accordance with the display distance data included in the display data.

In the present embodiment, the display control unit 30 adjusts a length in the depth direction Z of the image 70 while maintaining constant an amplitude of the vibrating screen 46 in a screen vibration direction. That is, the display control unit 30 does not emit the display light L in a period during which the vibrating screen 46 is in a first range of the amplitude, and emits the display light L in a period during which the vibrating screen 46 is in a second range of the amplitude. If a position and a ratio of the first range and the second range are adjusted, a position and a length in the depth direction Z of the image 70 are adjusted. Specifically, the vibrating screen 46 vibrates at a frequency of 60 [Hz] or more, and if the image projection unit 45 projects different videos having a plurality of frames within the period 1/60 [sec], the different videos (real images) having a plurality of frames are formed at each of vibration positions. That is, in the present embodiment, if real images having a plurality of frames overlap in the vibration direction of the vibrating screen 46, the first 3D real image 43 is generated. It is noted that the display control unit 30 may adjust the length of the image 70 in the depth direction Z by changing the amplitude of the vibrating screen 46.

The relay optical units 42 in FIG. 2 receive light of the first 3D real image 43 generated by the stereoscopic image display unit 41, form the second 3D real image 44 obtained by magnifying the first 3D real image 43, between the relay optical units 42, and then, project the display light L being light of the second 3D real image 44 toward the projected portion 2. The relay optical units 42 include, for example, a first relay optical unit 47 including a group of lenses configured to receive the light of the first 3D real image 43 generated by the stereoscopic image display unit 41, a second relay optical unit 48 configured to reflect the light passing through the first relay optical unit 47 and cooperate with an optical power of the first relay optical unit 47 to form the second 3D real image 44 obtained by magnifying the first 3D real image 43, and a third relay optical unit 49 configured to reflect the display light L being light of the second 3D real image 44, toward the projected portion 2.

The first relay optical unit 47 has a function of magnifying a video formed at each of vibration positions of the vibrating screen 46 in the first 3D real image 43, with a different magnification, and although a single lens is illustrated in FIG. 2 for simplicity, the first relay optical unit 47 is actually configured of a composition lens obtained by combining a plurality of thin film lenses not illustrated.

The second relay optical unit 48 includes, for example, a mirror having a concave reflection surface having a positive optical power, and receives the light of the first 3D real image 43 from the first relay optical unit 47, reflects the received light toward the third relay optical unit 49, and cooperates with the optical power of the first relay optical unit 47 to form the second 3D real image 44 obtained by magnifying the first 3D real image 43 between the second relay optical unit 48 and the third relay optical unit 49. If the first relay optical unit 47 has an optical function provided by the second relay optical unit 48, the second relay optical unit 48 may be omitted.

The third relay optical unit 49 is a concave mirror configured to reflect the display light L of the second 3D real image 44 toward the projected portion 2, and has a function of correcting an image distortion caused by a curved shape of the projected portion 2 and a function of magnifying the second 3D real image 44.

Thus, the configuration of the embodiment of the projection unit 40 configured to ensure that the 3D image 70 is visually recognized is described, but the above is not limiting. Alternatives of the projection unit 40 is described below.

Alternatives of Projection Unit 40

In another embodiment causing a viewer visually recognized an image of which the display distance from the viewer is variable, the projection unit 40 may employ known 3D display schemes, such as a parallax division scheme including a parallax barrier scheme and a lenticular lens scheme, a space reproduction scheme including a light field scheme and a hologram scheme, a transmittance adjustment screen scheme in which a plurality of screens having a light control layer whose transmittance can be adjusted are arranged in a stack in a thickness direction, a projector projects projection images, which are switched at high speed, toward the plurality of screens, and a 3D real image is displayed inside as a result of the plurality of screens appropriately adjusting respective dimming rates in response to the high-speed switching of the projection image, as disclosed in Japanese Patent Application Publication No. 2016-212318, a scheme of displaying a 3D real image inside by overlapping a plurality of liquid crystal display elements in a thickness direction, as disclosed in Japanese Patent Application Publication No. 2004-168230, and a light field display scheme. Thus, the configuration of the HUD device 10 according to the first to fourth embodiments of the present invention is described.

The first to fourth embodiments will be described below in detail with reference to FIG. 3 to FIG. 8.

First Embodiment

First, the description proceeds with reference to FIG. 3, FIG. 4(a), and FIG. 4(b). FIG. 3 is a flowchart illustrating a main operation procedure of the HUD device 10 in the first embodiment, and FIG. 4(a) and FIG. 4(b) are diagrams illustrating a display example of an image 75 corresponding to the flowchart of FIG. 3. FIG. 4(a) illustrates a display example of the image 75 in which step S13 in FIG. 3 is executed if a traffic light 200 is in a first lamp color state 210, and FIG. 4(b) illustrates a display example of the image 75 in which step S14 in FIG. 3 is executed if the traffic light 200 is in a second lamp color state 220.

In step S11 of FIG. 3, the display control unit 30 continuously and/or intermittently acquires, via a lamp color information acquisition unit 21, a lamp color state of a traffic light which the vehicle is scheduled to pass.

Subsequently, in step S12, the display distance determination unit 31 determines whether the lamp color state acquired by the lamp color information acquisition unit 21 in step S11 is the first lamp color state 210 red in the present embodiment) or the second lamp color state 220 (green in the present embodiment).

If the traffic light 200 is red (in the first lamp color state 210), the processing proceeds to step S13, and the display distance determination unit 31 sets the display distance 100 of the image 75 to a first display distance 110, as illustrated in FIG. 4(a), so that the projection unit 40 (stereoscopic image display unit 41) updates the display (step S15). Further, if the traffic light 200 is green (in the second lamp color state 220), the processing proceeds to step S14, and the display distance determination unit 31 sets the display distance 100 of the image 75 to a second display distance 120, as illustrated in FIG. 4(b), so that the projection unit 40 (stereoscopic image display unit 41) updates the display (step S15).

In this case, the first display distance 110 is shorter than the second display distance 120. In other words, the image 75 displayed at the first display distance 110 is visually recognized closer to the vehicle 1 (the driver of the vehicle 1) than the image 75 displayed at the second display distance 120. Therefore, according to the HUD device 10 of the present embodiment, the display distance 100 of the image 75 is shorter (first display distance 110) or longer (second display distance 120) in accordance with the acquired lamp color state of the traffic light 200. The driver needs to adjust the focal distance of the eye 3 to visually recognize the image 75, and can guess the lamp color state of the traffic light 200 from the difference in the display distance 100 of the image 70 recognized by the movement of the focal distance of the eye 3. Thus, if the image 70 includes an image indicating the lamp color state of the traffic light 200, it is possible for the driver to recognize a lamp color state of the traffic light 200 more reliably or more emphatically, based on different processes for change in color of the image or for change in the display distance 100 of the image 70. Further, if the image 70 does not include an image indicating the lamp color state of the traffic light 200, it is possible for the driver to recognize a lamp color state of the traffic light 200 more reliably or more emphatically, based on different processes for change in lamp color of the traffic light 200 being a real object existing in the real scene or for change in the display distance 100 of the image 70.

Second Embodiment

Next, the description proceeds with reference to FIG. 5, FIG. 6(a), and FIG. 6(b). FIG. 5 is a flowchart illustrating a main operation procedure of the HUD device 10 in a second embodiment, and FIG. 6(a) and FIG. 6(b) are diagrams illustrating a display example of the image 75 corresponding to the flowchart of FIG. 5. FIG. 6(a) illustrates a display example of the image 75 in which step S24 in FIG. 5 is executed if the traffic light 200 is in the first lamp color state 210, and FIG. 6(b) illustrates a display example of the image 75 in which step S25 in FIG. 5 is executed if the traffic light 200 is in the second lamp color state 220. The second embodiment differs from the first embodiment in that: the first display distance 110 is visually recognized at a position closer than the traffic light 200 with the vehicle 1 as reference, and the second display distance 120 is visually recognized at a position farther than the traffic light 200 with the vehicle 1 as reference.

In step S21 of FIG. 5, the display control unit 30 continuously and/or intermittently acquires, via a distance information acquisition unit 22, a distance 130 between the vehicle 1 and the traffic light 200 which the vehicle is scheduled to pass.

Subsequently, in step S22, the display control unit 30 continuously and/or intermittently acquires, via the lamp color information acquisition unit 21, the lamp color state of the traffic light 200 which the vehicle is scheduled to pass.

Subsequently, in step S23, the display distance determination unit 31 determines whether the lamp color state acquired by the lamp color information acquisition unit 21 in step S11 is the first lamp color state 210 (red in the present embodiment) or the second lamp color state 220 (green in the present embodiment).

If the traffic light 200 is red (in the first lamp color state 210), the processing proceeds to step S24, and the display distance determination unit 31 sets the display distance 100 of the image 75 to the first display distance 110, as illustrated in FIG. 6(a), so that the projection unit 40 (stereoscopic image display unit 41) updates the display (step S26). In the determination of the first display distance 110, the display distance determination unit 31 refers to the distance 130 between the traffic light 200 and the vehicle 1 acquired by the distance information acquisition unit 22 in step S21, and sets a predetermined distance within the distance 130 between the traffic light 200 and the vehicle 1 as the first display distance 110 of the image 70. Specifically, for example, the display distance determination unit 31 sets, as the first display distance 110 of the image 75, the same distance as the distance 130 between the traffic light 200 and the vehicle 1, or a distance within an area closer to the vehicle 1 than the traffic light 200 in real space coordinates and separated from the vehicle 1 by a predetermined distance, or a distance closer to the vehicle 1 by a predetermined distance with the traffic light 200 as reference in the real space coordinates.

Further, if the traffic light 200 is green (in the second lamp color state 220), the processing proceeds to step S25, and the display distance 100 of the image 75 is set to the second display distance 120, as illustrated in FIG. 6(b), so that the projection unit 40 (stereoscopic image display unit 41) updates the display (step S26). In the determination of the second display distance 120, the display distance determination unit 31 refers to the distance 130 between the traffic light 200 and the vehicle 1 acquired by the distance information acquisition unit 22 in step S21, and sets a predetermined distance longer than the distance 130 between the traffic light 200 and the vehicle 1 as the second display distance 120. Specifically, for example, the display distance determination unit 31 sets, as the second display distance 120 of the image 75, a distance in an area separated more from the vehicle 1 than the traffic light 200 in the real space coordinates and separated from the vehicle 1 by a predetermined distance, or a distance separated from the vehicle 1 by a predetermined distance with the traffic light 200 as reference in the real space coordinates.

In this case, the first display distance 110 is shorter than the distance 130 between the traffic light 200 and the vehicle 1, and the second display distance 120 is longer than the distance 130 between the traffic light 200 and the vehicle 1. In other words, the image 75 displayed at the first display distance 110 is visually recognized at the same distance as the traffic light 200 or closer to the vehicle 1 than the traffic light 200, and the image 75 displayed at the second display distance 120 is visually recognized farther away from the vehicle 1 than the traffic light 200. Therefore, according to the HUD device 10 of the present embodiment, the display distance 100 of the image 75 is closer than the traffic light 200 (first display distance 110) or farther than the traffic light 200 (second display distance 120) in accordance with the acquired lamp color state of the traffic light 200. The driver needs to adjust the focal distance of the eyes to visually recognize the image 75, and the lamp color state of the traffic light 200 can be guessed from the difference in the display distance 100 of the image 70 recognized by the movement of the focal distance of the eyes. Thus, if the image 70 includes an image indicating the lamp color state of the traffic light 200, it is possible for the driver to recognize the lamp color state of the traffic light 200 more reliably or more emphatically, based on different processes for change in color of the image or for change in the display distance 100 of the image 70. On the other hand, if the image 70 does not include an image indicating the lamp color state of the traffic light 200, it is possible for the driver to recognize the lamp color state of the traffic light 200 more reliably or more emphatically, based on different processes for change in lamp color of the traffic light 200 being a real object existing in the real scene or for change in the display distance 100 of the image 70. It is easier to clearly determine the lamp color state than in the first embodiment where the display distance determination unit 31 simply switches between the large display distance 100 and the small display distance 100 of the image. The distance between the near side (first display distance 110) and the far side (second display distance 120) of the display distance 100 of the image 70 is preferably 5 [m] or more.

Third Embodiment

Next, the description proceeds with reference to FIG. 7(a) to FIG. 7(c). FIG. 7(a) to FIG. 7(c) are diagrams each illustrating a display example of the image 75 in which the process of step S24 in FIG. 5 is executed, and illustrate a transition of the display of the image 75 as the vehicle 1 gradually approaches the traffic light 200. The display distance determination unit 31 according to the third embodiment sets the first display distance 110 at which the image 75 is displayed so that the image 75 is visually recognized at a position separated by a constant distance with the traffic light 200 as reference in the real space coordinates.

In step S24 of FIG. 5, the display distance determination unit 31 according to the third embodiment refers to the distance between the traffic light 200 and the vehicle 1 acquired by the distance information acquisition unit 22 in step S21, and sets, as the first display distance 110 at which the image 70 is displayed, a position closer to the vehicle 1 by a predetermined distance D1 with the distance 130 of the traffic light 200 as a reference in the real space coordinates.

Specifically, as illustrated in FIG. 7(a), if a distance 131 from the vehicle 1 to the traffic light 200 is separated by the predetermined distance D1 or more from a first distance 105 predetermined within the image display area 80, the display distance determination unit 31 maintains the setting of a first display distance 111 of the image 75 as the first distance 105. That is, the image 75 is displayed at the constant first distance 105 regardless of the position of the traffic light 200. For example, as illustrated in FIG. 7(a), the first distance 105 is set at a position (end) farthest from the vehicle 1 in the image display area 80, but is not limited thereto. The first distance 105 may be set at a predetermined position within the image display area 80.

Subsequently, as illustrated in FIG. 7(b), if the distance between a distance 132 from the vehicle 1 to the traffic light 200 and the first distance 105 predetermined within the image display area 80 is within the predetermined distance D1, or if the traffic light 200 is closer than the first distance 105, the display distance determination unit 31 maintains setting of a first display distance 112 of the image 75 at a position closer to the vehicle 1 by the predetermined distance D1 with the distance 132 of the traffic light 200 as a reference. That is, if the traffic light 200 approaches, the image 75 is visually recognized so that the distance from the traffic light 200 is maintained constant in the real space coordinates.

Subsequently, as illustrated in FIG. 7(c), if a distance 133 from the vehicle 1 to the traffic light 200 is less than the predetermined distance D1 from a second distance 106 predetermined within the image display area 80, the display distance determination unit 31 maintains the setting of a first display distance 113 of the image 75 to the second distance 106. That is, the image 75 is displayed at the constant second distance 106 regardless of the position of the traffic light 200. For example, as illustrated in FIG. 7(c), the second distance 106 is set at a position (end) of the image display area 80 closest to the vehicle 1, but is not limited thereto. The second distance 106 may be set at a predetermined position within the image display area 80.

To summarize the processing of the third embodiment illustrated in FIG. 7(a) to FIG. 7(c), (1) if the distance 131 from the vehicle 1 to the traffic light 200 is large (separated from the predetermined first distance 105 by the distance D1 or more), the display distance determination unit 31 displays the image 75 at the constant first distance 105 regardless of the position of the traffic light 200. (2) If the distance 133 from the vehicle 1 to the traffic light 200 is short (less than the distance D1 from the predetermined second distance 106), the display distance determination unit 31 displays the image 75 at the constant second distance 106 regardless of the position of the traffic light 200. (3) If the distance 132 from the vehicle 1 to the traffic light 200 is within a predetermined range (the range less than the sum of the first distance 105 and the distance D1, and equal to or more than the sum of the second distance 106 and the distance D1), the display distance determination unit 31 displays the image 75 in accordance with the position of the traffic light 200, so that the distance from the traffic light 200 is maintained constant in the real space coordinates. Thus, the distance between the traffic light 200 and the image 75 can be maintained constant during the display, and visual attention can be easily directed both to the display content of the image 75 and the traffic light 200. Further, the image 75 changes in accordance with the position of the traffic light 200, and thus, the approaching of the traffic light 200 can be recognized by visually recognizing the image 75.

Fourth Embodiment

Next, the description proceeds with reference to FIG. 8(a) to FIG. 8(c). FIG. 8(a) to FIG. 8(c) are diagrams each illustrating a display example of the image 75 in which the process of step S25 in FIG. 5 is executed, and illustrate a transition of the display of the image 75 as the vehicle 1 gradually approaches the traffic light 200. The display distance determination unit 31 according to the fourth embodiment maintains the setting of the image 75 to the predetermined second display distance 120 regardless of the position of the traffic light 200.

In step S25 of FIG. 5, the display distance determination unit 31 of the fourth embodiment displays the image 70 at a predetermined second display distance 121 regardless of the distances 131, 132, and 133 of the traffic light 200. It is noted that the second display distance 120 is set to a position farther from the vehicle 1 than the distance 130 of the traffic light 200, however, if the traffic light 200 is located at a position farther separated from the image display area 80 (for example, as illustrated in FIG. 8(a)), the second display distance 120 at which the image 70 is displayed may be exceptionally set at a position closer to the vehicle 1 than the distance 130 of the traffic light 200.

Accordingly, if the lamp color state of the traffic light 200 is the second lamp color state 220, the second display distance 121 at which the image 75 is displayed is maintained constant during the display, regardless of the position of the traffic light 200, so that the display content of the image 75 can be easily recognized, and it is possible to make it less likely that visual attention is directed to the traffic light 200 from the image 75.

It is noted that the present invention is not limited to the above embodiments and drawings. Modifications (including deletion of constituent elements) may be appropriately added to the embodiments and the drawings as long as the gist of the present invention is not changed.

Modifications

In the embodiments described above, the lamp color information acquisition unit 21 acquires the first lamp color state 210 and the second lamp color state 220 of the traffic light 200. However, the lamp color information acquisition unit 21 may acquire only either one of the first lamp color state 210 and the second lamp color state 220. It is possible that the lamp color information acquisition unit 21 acquires only either one of the first lamp color state 210 and the second lamp color state 220 of the traffic light 200, and if the predetermined lamp color state cannot be acquired, the lamp color state can be determined to be the other lamp color state.

Further, in the embodiments described above, the lamp color information acquisition unit 21 acquires the lamp color state of the traffic light 200 at the actual time. However, the lamp color information acquisition unit 21 may acquire the remaining time (modification example of the lamp color state) until the first lamp color state 210 or the second lamp color state 220 is reached, and the display distance determination unit 31 may determine the display distance 100 of the image 70 based on the remaining time (the lamp color state) until the first lamp color state 210 or the second lamp color state 220 is reached. Further, the lamp color information acquisition unit 21 may acquire the time elapsed (modification example of the lamp color state) since the first lamp color state 210 or the second lamp color state 220 is reached, and the display distance determination unit 31 may determine the display distance 100 of the image 70 based on the time elapsed (the lamp color state) since the first lamp color state 210 or the second lamp color state 220 is reached.

DESCRIPTION OF REFERENCE NUMERALS

1 Vehicle
2 Projected portion
3 Eye
4 Eye box
5 Communication interface
10 HUD device (head-up display device)
20 Information acquisition unit
21 lamp color information acquisition unit
22 Distance information acquisition unit
30 Display control unit
31 Display distance determination unit
32 Display data generation unit
40 Projection unit
70 Image
71 First 2D image
72 Second 2D image
73 3D image
75 Image
80 Image display area
200 Traffic light
210 First lamp color state
220 Second lamp color state
D1 Distance
L Display light

The invention claimed is:

1. A head-up display device, comprising:
a projection unit configured to project, towards a projected portion, display light displaying an image at a variable display distance from a viewer;
a lamp color information acquisition unit configured to acquire a lamp color state of a traffic light which a vehicle is scheduled to pass;
a display distance adjustment unit configured to change the display distance of the image, based on the lamp color state acquired by the information acquisition unit; and
a distance information acquisition unit configured to acquire a distance to the traffic light of which the lamp color state is acquired by the lamp color information acquisition unit, wherein
the display distance adjustment unit refers to the distance to the traffic light acquired by the distance information acquisition unit, wherein
if the lamp color state acquired by the lamp color information acquisition unit is a first lamp color state, the display distance adjustment unit sets the display distance less than the distance to the traffic light and displays at least a part of the image to be visually recognized in front of the traffic light, and wherein
if the lamp color state acquired by the lamp color information acquisition unit is a second lamp color state, the display distance adjustment unit sets the display distance greater than the distance to the traffic light and displays at least a part of the image to be visually recognized behind the traffic light.

2. The head-up display device according to claim 1, wherein the first lamp color state is red, and the second lamp color state is green.

3. The head-up display device according to claim 2, wherein if the display distance adjustment unit displays at least a part of the image to be visually recognized in front of the traffic light, the display distance adjustment unit gradually reduces the display distance as the distance to the traffic light acquired by the distance information acquisition unit decreases.

4. The head-up display device according to claim 1, wherein if the display distance adjustment unit displays at least a part of the image to be visually recognized in front of the traffic light, the display distance adjustment unit gradually reduces the display distance as the distance to the traffic light acquired by the distance information acquisition unit decreases.

5. The head-up display device according to claim 1, wherein if the display distance adjustment unit displays at least a part of the image to be visually recognized behind the traffic light, the display distance adjustment unit maintains the display distance constant even if the distance to the traffic light acquired by the distance information acquisition unit decreases.

* * * * *